June 13, 1944.  E. L. REVARD  2,351,544
THERMO-SYPHON CIRCULATOR
Filed July 24, 1942  2 Sheets-Sheet 1
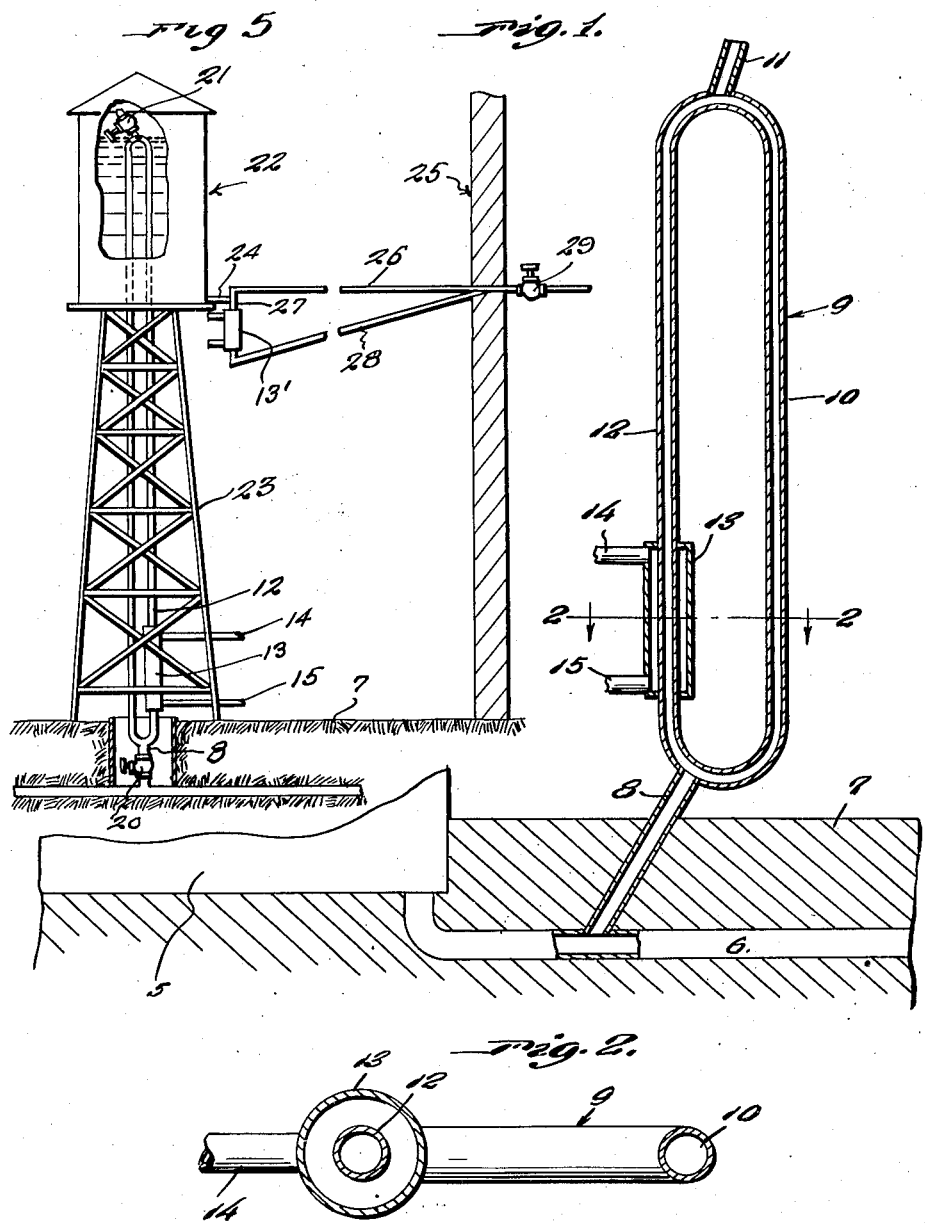
Inventor
Edward Lynn Revard
By Clarence A. O'Brien
and Harvey B. Jacobson
Attorneys

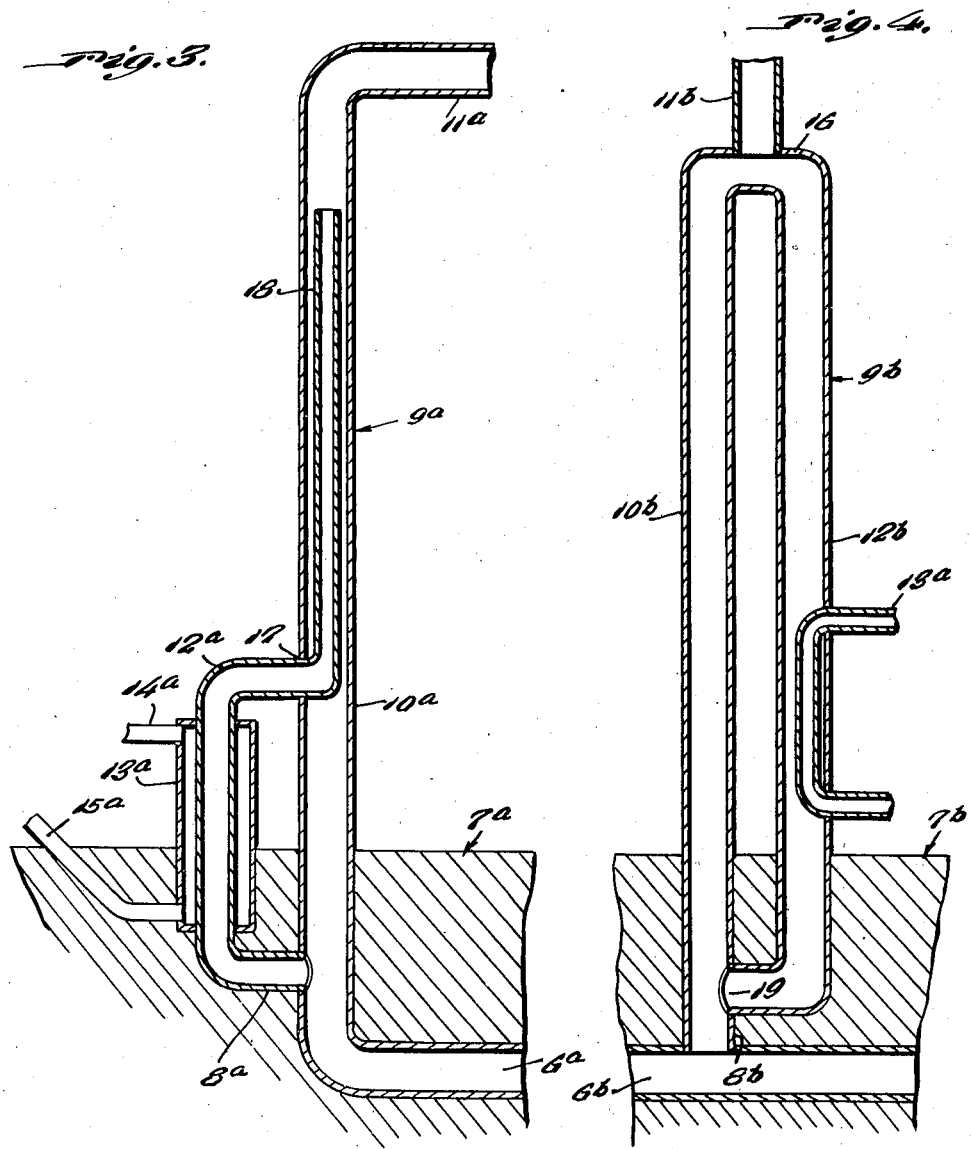

Patented June 13, 1944

2,351,544

UNITED STATES PATENT OFFICE 2,351,544

THERMOSIPHON CIRCULATOR

Edward Lynn Revard, Ponca City, Okla.

Application July 24, 1942, Serial No. 452,232

5 Claims. (Cl. 138—32)

The invention relates to improvements in thermo-siphon circulators, the primary object of the invention being to provide arrangements of this character especially adapted for use is connection with the movement of liquids, vapors or gases in areas wherein the conduits containing the same are exposed to freezing temperatures, to positively prevent sufficient stagnation of the liquids or gases during interruptions in operational movements thereof to allow of freezing.

Other important objects and advantages of the invention will be apparent from a reading of the following description taken in connection with the appended drawings, wherein for purposes of illustration preferred embodiments of the invention are shown.

In the drawings:

Figure 1 is a general schematic vertical sectional view of an installation in accordance with the present invention showing a conduit containing fluid such as a gas, a vapor or a liquid leading from a storage tank or source of fluid through an area exposed to freezing temperatures.

Figure 2 is an enlarged fragmentary horizontal sectional view taken through Figure 1 along the line 2—2 and looking downwardly in the direction of the arrows.

Figure 3 is an enlarged fragmentary vertical sectional view taken through a modified form of installation.

Figure 4 is a similar view of a still further modified form of installation.

Figure 5 is a part sectional and elevational view showing a dual installation in accordance with the present invention, wherein two different forms of circulators are used in the same installation, one to protectively circulate the fluid in the vertical line and the other to protectively circulate the fluid in the horizontal line.

Referring in detail to the drawings, and first to the embodiment of the invention shown in Figures 1 and 2 of the drawings, the numeral 5 generally designates a tank or other source of fluid supply from which leads the protectively buried conduit 6 which is located below ground level, and has a branch 8 leading therefrom which has the portion 9 which is a thermo-siphon circulator exposed above the ground to freezing temperatures.

The circulator 9 comprises a vertically elongated substantially closed loop conduit 10 having an outlet 11 for the fluid at a point outside of the freezing area, whereby the circulated fluid whether liquid, vapor, or gas is continued in circulation in the exposed areas of the circulator during periods when the contents of the conduit have no other means of movement. The loop conduit 10 is characterized by a vertical riser portion 12 which is equipped, in this instance, by a jacket 13 surrounding the riser and containing a heating medium entering it by the pipes 14 and 15, whereby the riser 12 is endowed with a temperature substantially more elevated than any other portion of the loop 10, so that the liquid or gas has a positive tendency in accordance with well known principles to rise in the riser 12 and to have its place taken at the lower end of the heater 13 by the subsiding cooler fluid. By these actions the fluid circulates upwardly through the riser 12 to the highest point of the loop conduit 10 then starts downwardly in the conduit 10 so as to downwardly displace the cooler contents of the conduit, thereby causing motion of the fluid in the conduit 10, the speed of which is determined by the amount of heat applied by the heater 13.

Referring now to the embodiment of the invention shown in Figure 3 of the drawings and which is generally designated 9a, this comprises also a duplex conduit forming a circulation loop and characterized by the riser conduit 12a which is heated by a jacket 13a supplied with heating medium by the pipes 14a and 15a, the riser portion 12a being located partly below the ground level 7a and having its lower end portion connected as indicated by the numeral 8a with the conduit 6a leading from the tank or container of the liquid or gas to be circulated (not shown). In the instance of this embodiment the companion leg of the loop circuit comprises the vertical extension 10a of the conduit 6a and has at its upper end the outlet or return 11a. The riser 12a has a portion smaller in diameter than the leg 10a and enters the leg 10a at the point indicated by the numeral 17 and rises spacedly therein as indicated by the numeral 18, to a point below the upper end of the leg 10a. In this embodiment the liquid or gas heated in the riser 12a by the heater 13a rises in the riser 12a and causes the colder liquid or gas to displace the risen liquid or gas, so as to withdraw the liquid or gas from the conduit 6a and discharge the same at the outlet 11a.

Referring now to the embodiment of the invention shown in Figure 4 of the drawings, this form of circulator is generally designated by the numeral 9b and comprises the vertical riser conduit 12b in which is inserted a heating medium pipe 13a. The upper end of the riser 12b connects with the upper end of the companion conduit 10b as indicated by the numeral 16 to join an outlet 11b after the manner of the closed loop of the embodiment shown in Figure 1 of the drawings, while the lower end of the riser 12b at a point below the ground level 7b connects with the lower end of the companion conduit 10b as indicated by the numeral 19 to provide a common connection 8b with the conduit 6b leading from the tank or container (not shown). In this form of the invention the heating of the lower portion of the riser 12b by the heater 13a causes the liquid or gas in the riser to move upwardly toward the outlet 11b, while the colder liquid or gas in the companion conduit 10b subsides and tends to move into the lower end of the riser 12b and take the place of the risen warmer fluid, whereby a circulation is produced which acts to draw the liquid or gas from the conduit 6b and circulate the same continuously, while the heat is applied, to the outlet 11b which is connected to any desired destination or to the said tank or container.

It is characteristic of all of the described embodiments that major portions of the circulators are exposed to the extreme low temperatures in the region of storage of the liquid or gas, while a minor portion thereof is subjected to heating, whereby an automatic thermo-siphon circulation of the liquid or gas is produced, which positively prevents freezing of the liquid or gas in the tanks or containers.

Figure 5 of the drawings exemplifies employment of two circulators in accordance with the present invention in association with a solution tank. The circulator 9 has its conduit 8 connected at its lower end with a water supply pipe 6, with a cut-off valve 20 in the conduit 6. The upper end of the loop has the outlet conduit 11 which is provided with a cut-off valve 21, the upper part of the loop rising into the upper part of the solution tank 22 which is supported in an elevated position by the standard 23, the portion of the loop between the valve 8 and the tank 22 being exposed to the freezing temperatures. The heater 13 is associated with the lower part of the leg 12 of the said loop with heating medium lines 14 and 15 extending away from the heater to a suitable source.

The solution tank discharge conduit 24 extends horizontally into a building 25 wherein the solution formed in the tank 22 is used or stored, the portion of the conduit between the tank and the building being exposed to freezing temperatures. To circulate the solution in the conduit 24 the same can be modified to provide the horizontal part 26, a depending vertical part 27 including a heater 13', and an angulated part 28 connecting the lower end of the vertical part 27 with the remote end of the horizontal part 26. The arrangement keeps the solution circulating in the resultant loop even when the cut-off valve 29 in the conduit 24 is closed, thereby preventing freezing of the solution in the conduit 24.

Although there are shown and described herein preferred embodiments of the invention, it is to be definitely understood that it is not desired to limit the application of the invention thereto, except as may be required by the scope of the subjoined claims.

Having described the invention, what is claimed as new is:

1. A thermo-siphon circulator for a fluid from a source of supply; said circulator being exposed to sub-freezing temperature and comprising a looped conduit for said fluid with a supply connection at one end from said source and an outlet from its opposite end, and heating means for the conduit adjacent the supply connection.

2. A thermo-siphon circulator for a fluid from a source of supply exposed to sub-freezing temperature; said circulator comprising a looped conduit for said fluid with a supply connection at one end from said source and an outlet from its opposite end, and heating means for the conduit adjacent the supply connection, said conduit being in the form of a tubular loop having two interconnected legs, one of which constitutes the supply portion, said heating means consisting of a short pipe within said supply portion with pipe connection from a source of heat supply.

3. A thermo-siphon circulator for a fluid from a source of supply; said circulator being exposed to sub-freezing temperature and comprising a conduit for said fluid with a supply connection at one end from said source and an outlet from its opposite end, and heating means for the conduit adjacent the supply connection, said conduit being in the form of a tubular loop having two legs one of which constitutes the supply portion, and said heating means consisting of a jacket surrounding the supply portion, said jacket being heated from a source of heat.

4. A thermo-siphon circulator for a fluid from a source of supply, said circulator being exposed to freezing temperature and comprising a riser connected in intake communication with said source, said riser having a portion elevated about the level of intake of the fluid, heating means applied to a lower portion of the riser to cause the fluid present in the riser to rise, and a complementary conduit leg connected in communication by top and bottom loops with said riser, whereby cool fluid from the source is flowed into said riser to take the place of the risen warmer fluid in the riser, thus providing a continuous fluid circulation in the circulator, and an outlet from said riser and said leg for discharging fluid when desired.

5. A thermo-siphon circulator for a fluid from a source of supply, said circulator comprising a looped conduit having a riser leg and a return leg connected in intake communication with said source, said riser leg having at least a portion elevated above the level of intake of the fluid and exposed to freezing, heating means applied to the lower portion of the riser leg to cause the fluid present therein to rise, whereby cooler fluid is flowed into said riser leg to take the place of the risen warmer fluid in the riser leg, and an outlet with which said riser and said return leg are in communication for discharging the warmed fluid from the circulator when required.

EDWARD LYNN REVARD.